US011256818B2

(12) United States Patent
Espinosa et al.

(10) Patent No.: US 11,256,818 B2
(45) Date of Patent: *Feb. 22, 2022

(54) SYSTEM AND METHOD FOR ENABLING AND VERIFYING THE TRUSTWORTHINESS OF A HARDWARE SYSTEM

(71) Applicant: Corlina, Inc., Menlo Park, CA (US)

(72) Inventors: Antonio J. Espinosa, Menlo Park, CA (US); Shashi Sastry, Menlo Park, CA (US); Vincent Bemmel, Menlo Park, CA (US); Sameer Merchant, Menlo Park, CA (US)

(73) Assignee: Corlina, Inc., Menlo Park, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 16/119,357

(22) Filed: Aug. 31, 2018

(65) Prior Publication Data

US 2019/0207957 A1    Jul. 4, 2019

Related U.S. Application Data

(60) Provisional application No. 62/639,813, filed on Mar. 7, 2018, provisional application No. 62/611,508, filed
(Continued)

(51) Int. Cl.
*G06F 21/60*        (2013.01)
*H04L 29/06*        (2006.01)
(Continued)

(52) U.S. Cl.
CPC .............. *G06F 21/606* (2013.01); *G06F 8/65* (2013.01); *G06F 16/2255* (2019.01);
(Continued)

(58) Field of Classification Search
CPC .... G06F 8/65; G06F 16/9038; G06F 16/2255; G06F 16/951; G06F 16/9538; G06F 21/606; H04L 9/0637; H04L 9/3239
See application file for complete search history.

(56) References Cited

U.S. PATENT DOCUMENTS 6,892,308 B1    5/2005  Medvinsky
9,961,096 B1    5/2018  Pierce
(Continued)

FOREIGN PATENT DOCUMENTS

WO    WO 2016/178127 A1    11/2016

OTHER PUBLICATIONS

PCT/US2018/067952 International Search Report and Written Opinion of the International Searching Authority dated Mar. 21, 2019.
(Continued)

*Primary Examiner* — Arezoo Sherkat
(74) *Attorney, Agent, or Firm* — Alston & Bird LLP

(57) ABSTRACT

To determine whether an IoT system connected with a network environment (e.g., the internet) is compromised, a networked Trust as a Service (TaaS) server receives system data indicative of various characteristics of the IoT system, wherein the system data is harvested by a software agent installed on the IoT system. The TaaS server initially establishes a baseline characteristics profile for the IoT system, such that subsequently received system data from the software agent may be compared against the baseline characteristics profile to quickly identify discrepancies between the originally established baseline characteristics profile and current operating characteristics of the system. Such discrepancies may be caused by desirable software updates, in which case the discrepancies may be integrated into the baseline characteristics profile, or the discrepancies may result from the IoT system being undesirably compromised.

20 Claims, 10 Drawing Sheets

Related U.S. Application Data on Dec. 28, 2017, provisional application No. 62/613,006, filed on Jan. 2, 2018, provisional application No. 62/623,838, filed on Jan. 30, 2018.

(51) Int. Cl.
| | |
|---|---|
| *G06F 8/65* | (2018.01) |
| *G06F 16/9538* | (2019.01) |
| *G06F 16/9038* | (2019.01) |
| *H04L 9/32* | (2006.01) |
| *H04L 9/06* | (2006.01) |
| *G06F 16/22* | (2019.01) |
| *G06F 16/951* | (2019.01) |
| *G06F 8/60* | (2018.01) |

(52) U.S. Cl.
CPC ........ *G06F 16/9038* (2019.01); *G06F 16/951* (2019.01); *G06F 16/9538* (2019.01); *H04L 9/0637* (2013.01); *H04L 9/3239* (2013.01); *H04L 63/12* (2013.01); *H04L 63/1416* (2013.01); *H04L 63/1425* (2013.01); *G06F 8/60* (2013.01); *H04L 2209/38* (2013.01)

(56) References Cited

U.S. PATENT DOCUMENTS

| | | | |
|---|---|---|---|
| 10,057,264 B1 | 8/2018 | ElNakib et al. | |
| 10,867,055 B2 | 12/2020 | Espinosa et al. | |
| 2002/0059144 A1 | 5/2002 | Meffert et al. | |
| 2005/0044478 A1 | 2/2005 | Ali et al. | |
| 2005/0069136 A1 | 3/2005 | Thornton et al. | |
| 2006/0245590 A1 | 11/2006 | Brickell | |
| 2010/0042835 A1 | 2/2010 | Lee et al. | |
| 2010/0115269 A1 | 5/2010 | Allen et al. | |
| 2012/0102317 A1 | 4/2012 | Mathur et al. | |
| 2013/0080197 A1 | 3/2013 | Kung et al. | |
| 2015/0121070 A1 | 4/2015 | Lau et al. | |
| 2015/0163121 A1 | 6/2015 | Mahaffey et al. | |
| 2015/0350228 A1* | 12/2015 | Baxley .............. | H04W 12/1202 726/23 |
| 2015/0363607 A1 | 12/2015 | Yang et al. | |
| 2016/0098561 A1 | 4/2016 | Keller et al. | |
| 2016/0105292 A1 | 4/2016 | Choi et al. | |
| 2016/0210450 A1 | 7/2016 | Su | |
| 2016/0212099 A1* | 7/2016 | Zou ..................... | H04L 63/0263 |
| 2016/0261465 A1 | 9/2016 | Gupta et al. | |
| 2016/0300049 A1 | 10/2016 | Guedalia et al. | |
| 2017/0011298 A1 | 1/2017 | Pal et al. | |
| 2017/0006381 A1 | 3/2017 | Bruce et al. | |
| 2017/0078435 A1 | 3/2017 | Babol et al. | |
| 2017/0093585 A1 | 3/2017 | Lee | |
| 2017/0111177 A1 | 4/2017 | Oguma et al. | |
| 2017/0126718 A1 | 5/2017 | Baradarana et al. | |
| 2017/0134415 A1 | 5/2017 | Muddu et al. | |
| 2017/0149813 A1 | 5/2017 | Wright et al. | |
| 2017/0171314 A1 | 6/2017 | Britt | |
| 2017/0232300 A1 | 8/2017 | Tran et al. | |
| 2017/0249235 A1 | 8/2017 | Staples et al. | |
| 2017/0295195 A1* | 10/2017 | Wettstein ................ | G06F 21/57 |
| 2017/0302663 A1* | 10/2017 | Nainar .................. | H04L 63/123 |
| 2017/0339178 A1 | 11/2017 | Mahaffey et al. | |
| 2017/0359417 A1 | 12/2017 | Chen et al. | |
| 2018/0097639 A1* | 4/2018 | Gulati ........................ | G06F 8/61 |
| 2018/0144139 A1* | 5/2018 | Cheng .................. | G06F 21/577 |
| 2018/0181091 A1 | 6/2018 | Funk et al. | |
| 2018/0260562 A1 | 9/2018 | Chen et al. | |
| 2018/0285555 A1 | 10/2018 | Dong et al. | |
| 2018/0332065 A1 | 11/2018 | Gupta et al. | |
| 2018/0367573 A1 | 12/2018 | Ouyang | |
| 2019/0081961 A1 | 3/2019 | Bansal | |
| 2019/0098028 A1* | 3/2019 | Ektare ................... | G06F 21/577 |
| 2019/0138716 A1 | 5/2019 | Huang et al. | |
| 2019/0156041 A1 | 5/2019 | Levy | |
| 2019/0205552 A1 | 7/2019 | Espinosa et al. | |
| 2019/0207965 A1 | 7/2019 | Espinosa et al. | |
| 2019/0238520 A1 | 8/2019 | Espinosa et al. | |
| 2019/0306698 A1 | 10/2019 | Goto | |
| 2019/0312902 A1* | 10/2019 | Wettstein ............ | H04W 12/108 |
| 2020/0007342 A1* | 1/2020 | Liem .................... | H04L 9/0637 |
| 2020/0211721 A1 | 7/2020 | Ochoa et al. | |

OTHER PUBLICATIONS

PCT/US2018/67837 International Search Report and Written Opinion of the International Searching Authority dated Mar. 11, 2019.
PCT/US2018/67848 International Search Report and Written Opinion of the International Searching Authority dated Feb. 28, 2019.
PCT/US2019/015854 International Search Report and Written Opinion of the International Searching Authority dated Apr. 29, 2019.
U.S. Appl. No. 16/119,269, Notice of Allowance dated Sep. 3, 2020.
U.S. Appl. No. 16/236,170, Final Office Action dated Mar. 3, 2021.
U.S. Appl. No. 16/236,170, Notice of Allowance and Interview Summary dated Jul. 8, 2021.
U.S. Appl. No. 16/262,430, Non-Final Office Action dated Jul. 12, 2021.
U.S. Appl. No. 16/262,430, Final Office Action dated Dec. 9, 2021.

* cited by examiner

SYSTEM AND METHOD FOR ENABLING AND VERIFYING THE TRUSTWORTHINESS OF A HARDWARE SYSTEM

CROSS-REFERENCE TO RELATED APPLICATIONS

The present application claims priority to U.S. Application No. 62/639,813, entitled "Trust Metric" filed on Mar. 7, 2018, U.S. Application No. 62/611,508, entitled "System and Method for Trustworthy Connected Manufacturing Systems" filed on Dec. 28, 2017, U.S. Application No. 62/613,006, filed Jan. 2, 2018, entitled "System and Method for Enabling and Verifying the Trustworthiness of a Device," and U.S. Application No. 62/623,838, filed Jan. 30, 2018, entitled "User and Device Onboarding," the contents of each of which are incorporated herein by reference in their entirety.

FIELD OF THE INVENTION

The present invention is related to support of connected mission-critical cyber-physical systems, and more particularly to a system and method for real time monitoring and validation of the trustworthiness of manufacturing systems, processes and products.

BACKGROUND OF THE INVENTION

The Internet-of-Things (IoT) has introduced a new paradigm of distributed sensors and actuators that are embedded in industrial systems, and connected via an industrial IoT network. The key benefits of this include a high granularity of embedded sensor points that add critical real time visibility to the behavior of the factory systems. This enables modern systems to scale to automated, self-aware, just in time factories.

The current trend of automation and data exchange in manufacturing is often referred to as Industrie 4.0 or Factory of the Future. The Industrie 4.0 evolution leverages digital transformation and is characterized by four stages of visibility, transparency, predictive capacity, and adaptability. Real-time visibility is an essential step for the evolution to self-aware Industrial IoT (IIoT) systems.

The network has become a critical part of modern manufacturing systems. Modern factory applications typically put higher demands on these networks as they support higher load demands that directly impact operations' performance.

IIoT trustworthiness may be defined as the degree of confidence one has that the system performs as expected in the face of environmental disruptions, human errors, system faults and attacks. Systems are made trustworthy to merit the trust of their users. An IIoT trustworthiness is often expressed via a combination of characteristics, i.e., key aspects of security, safety, resilience, reliability, and privacy. The process for establishing and tracking IIoT trustworthiness may be utilized to track the trustworthiness of individual IIoT devices as they progress through their initial manufacturing process and into normal use in an industrial manufacturing environment.

A key challenge with conventional systems is that there is often no consistent framework to validate and establish trust into the authenticity and integrity of IIoT devices. Anomalies during the manufacturing process could adversely affect the effectiveness of the process, and/or the integrity of manufactured products.

The development, manufacturing, installation and operation of an IIoT system (e.g., encompassing one or more IIoT devices, manufacturing processes/machinery, factories, and/or the like) typically involves multiple organizations. The device and artifacts (application software and OS) installed on a device or other system can be compromised at any stage during the device's lifetime. A person can replace any component of the device during its manufacturing installation or operations stages.

There is no common, intuitive gauge to express a level of trustworthiness associated with an IIoT device. Such a gauge could provide the confidence that a manufacturing site or product meets operational standards. Furthermore, currently there is no flexible means to monitor a device's trustworthiness as it moves from the manufacturing floor to its deployment location which could be anywhere globally. Moreover, even if trustworthiness could be certified during the manufacturing phase, there is currently no consistent means for verifying the authenticity of a product during the life of the product.

BRIEF SUMMARY

Various embodiments are directed to a computer-implemented method for determining trust of an Internet of Things (IoT) system within a networked environment. In various embodiments, the method comprises: receiving, via a communication interface in communication with the IoT system via the networked environment, system data indicative of artifacts of the IoT system harvested by a software agent installed on the IoT system; generating, via one or more processors, a baseline characteristics profile based at least in part on the system data; storing the baseline characteristics profile within a storage device accessible to the one or more processors; receiving, from the software agent installed on the IoT system, updated system data indicative of updated artifacts harvested from the IoT system; and determining whether the updated system data indicates that the IoT system is compromised by: comparing the updated system data against the baseline characteristics profile; and upon detecting a discrepancy between the updated system data and the baseline characteristics profile, establishing a trust metric based at least in part on the detected discrepancy.

In certain embodiments, the system data comprises one or more of: system hardware data; system image data; application data; and system behavior data. In various embodiments, at least a portion of the system data is harvested from firmware of the IoT system. Moreover, the storage system may be embodied as a blockchain ledger.

The method may further comprise steps for for updating the baseline characteristics profile by replacing at least a portion of the baseline characteristics profile with at least a portion of the updated system data. Moreover, the method may be further characterized by generating an alert upon determining that the trust metric indicates that the IoT system is compromised. In certain embodiments, generating the baseline characteristics profile comprises generating a hash based at least in part on the system data; and comparing the updated system data against the baseline characteristics profile comprises: generating a hash based on the updated system data; and comparing the hash of the updated system data against the baseline characteristics profile.

Certain embodiments are directed to a system for determining trust of an Internet of Things (IoT) system within a networked environment. The system may comprise a communication interface in communication with the IoT system via the networked environment, wherein the communication interface is configured to receive system data indicative of artifacts of the IoT system harvested by a software agent installed on the IoT system; a storage device; and one or more processors. The one or more processors may be collectively configured to: generate a baseline characteristics profile based at least in part on the system data; store the baseline characteristics profile within the storage device; receive, via the communication interface in communication with the software agent installed on the IoT system, updated system data indicative of updated artifacts harvested from the IoT system; and determine whether the updated system data indicates that the IoT system is compromised by: comparing the updated system data against the baseline characteristics profile; and upon detecting a discrepancy between the updated system data and the baseline characteristics profile, establishing a trust metric based at least in part on the detected discrepancy.

In certain embodiments, the system data comprises one or more of: system hardware data; system image data; application data; and system behavior data. Moreover, at least a portion of the system data may be harvested from firmware of the IoT system. In certain embodiments, the storage system is embodied as a blockchain ledger. Moreover, the one or more processors may be further configured for updating the baseline characteristics profile by replacing at least a portion of the baseline characteristics profile with at least a portion of the updated system data. The processors of certain embodiments may be further configured for generating an alert upon determining that the trust metric indicates that the IoT system is compromised. In certain embodiments, generating the baseline characteristics profile comprises generating a hash based at least in part on the system data; and comparing the updated system data against the baseline characteristics profile comprises: generating a hash based on the updated system data; and comparing the hash of the updated system data against the baseline characteristics profile.

Various embodiments are directed to a non-transitory computer-readable storage medium comprising executable portions stored thereon, wherein the executable portions are configured to, when executed by a processor, cause the processor to: receive, via a communication interface in communication with an IoT system via a networked environment, system data indicative of artifacts of the IoT system harvested by a software agent installed on the IoT system; generate a baseline characteristics profile based at least in part on the system data; store the baseline characteristics profile within a storage device accessible to the one or more processors; receive, from the software agent installed on the IoT system, updated system data indicative of updated artifacts harvested from the IoT system; and determine whether the updated system data indicates that the IoT system is compromised by: comparing the updated system data against the baseline characteristics profile; and upon detecting a discrepancy between the updated system data and the baseline characteristics profile, establishing a trust metric based at least in part on the detected discrepancy.

In certain embodiments, the system data comprises one or more of: system hardware data; system image data; application data; and system behavior data. Moreover, the storage system may be a blockchain ledger. In certain embodiments, the executable portions of the non-transitory computer readable storage medium may be further configured to, when executed by a processor, cause the processor to replace at least a portion of the baseline characteristics profile with at least a portion of the updated system data. In certain embodiments, those executable portions may be further configured to, when executed by a processor, cause the processor to generate an alert upon determining that the trust metric indicates that the IoT system is compromised. Moreover, generating the baseline characteristics profile may comprise generating a hash based at least in part on the system data; and comparing the updated system data against the baseline characteristics profile may comprise: generating a hash based on the updated system data; and comparing the hash of the updated system data against the baseline characteristics profile.

DETAILED DESCRIPTION OF THE INVENTION

Figure 1:
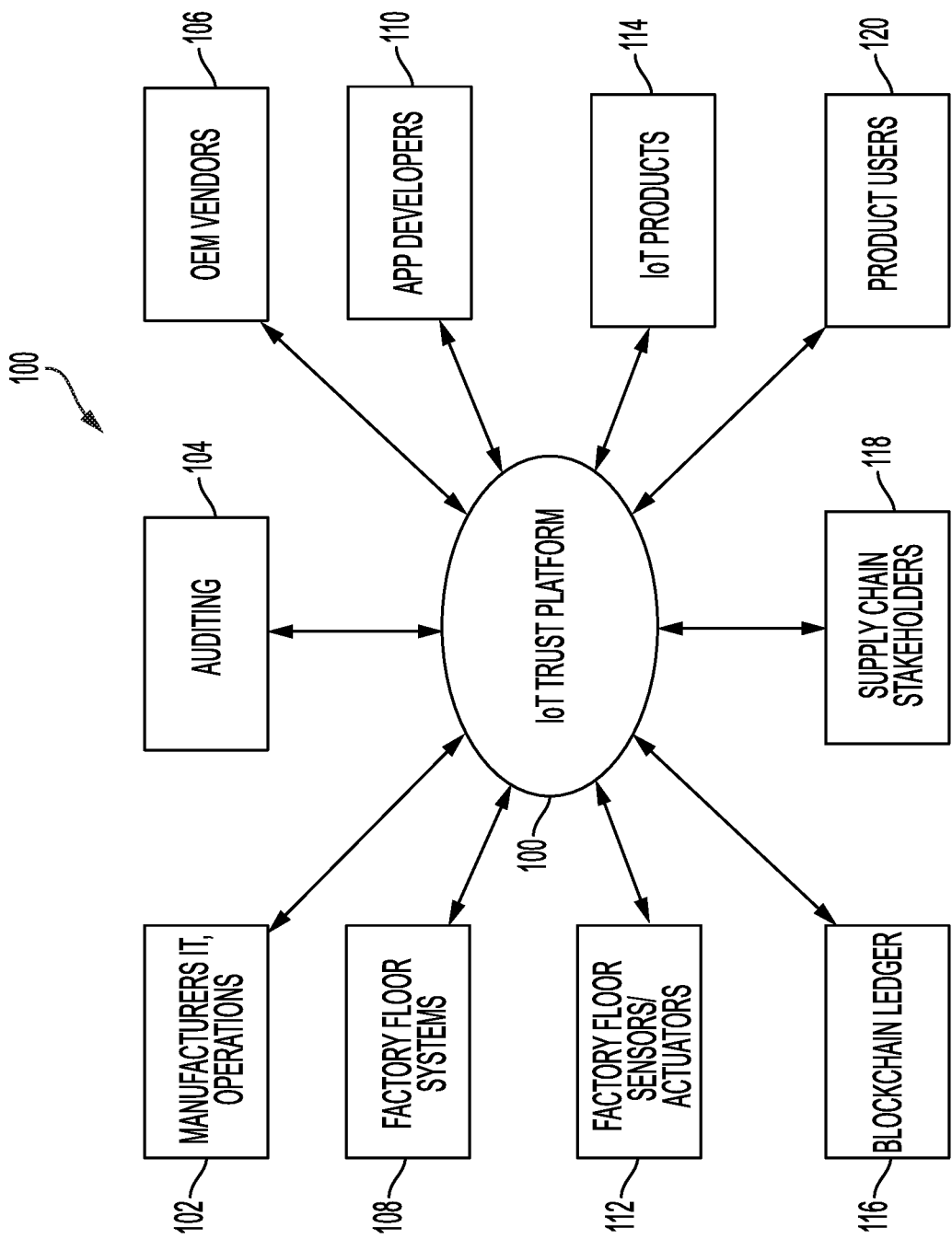
FIG. 1 is a simplified block diagram of an ecosystem in accordance with one embodiment of the present invention.

Since IIoT systems (e.g., a device, a group of devices, a manufacturing process/machinery/line, a factory, a warehouse, a security monitoring system, and/or the like) play a vital role in remote monitoring and control of industrial processes, warehouse management processes, logistics processes, and/or the like it is critical to verify the operational integrity of such systems at all times. Embodiments of the present invention continuously monitor IIoT/IoT system behavior to ensure they are not compromised during operations. By ensuring that IIoT/IoT systems are not compromised, users of these systems are provided with a level of assurance that substantive data generated by these systems may be trusted, because the systems maintain a high degree of operational integrity during use.

Various embodiments overcome inherent difficulties in a networked environment for maintaining high levels of assurances that a particular networked system remains uncompromised. In today's complex environment of IoT/IIoT systems (e.g., devices, collections of devices, and/or the like), there are many different ways that a particular system may become compromised. Various systems, such as individual devices may become physically compromised, for example, where individuals with nefarious intentions and/or who lack the appropriate knowledge for securely interacting with devices, manipulate these devices (e.g., replacing parts on the devices, changing user-definable characteristics of the devices, connecting additional devices to communication ports of the devices, and/or the like). These changes to devices that are made by a user physically located at the device may be difficult to detect by other trusted devices interacting with the device via a network. Although other trusted individuals may visually see these changes taking place, they may not immediately recognize the impacts on the changes they are witnessing, they may not know which device is being manipulated, or those changes may go completely unnoticed.

Devices or other systems may also be electronically compromised, for example when unauthorized software is pushed to the devices (e.g., spyware, key trackers, viruses, unauthorized software updates, and/or the like), when unauthorized changes are made remotely to the devices, and/or the like. While these changes may be recognized by other trusted networked systems, those systems are generally incapable of determining whether the electronic changes are authorized or not. Moreover, these changes are often visually imperceptible by individuals, and therefore individuals with physical access to these potentially compromised devices may be incapable of determining whether the device has been compromised.

Various embodiments thus provide systems and methods for overcoming these difficulties in determining whether a particular system has been compromised, utilizing characteristics of systems that are unique to computerized network environments to monitor and determine a level of trustworthiness of a particular device. For example, because various hardware components have associated electronic signatures (e.g., characteristics of those systems that are unique to the particular hardware configuration and are detectable via other networked systems, such as MAC addresses, timing signatures, user settings, and/or the like), and because electronic/software components have similar unique characteristics (e.g., license key codes, software version numbers, and/or the like) that are detectable via networked systems, various embodiments may track one or more of those characteristics to determine whether a particular system has been compromised.

Embodiments of the present invention provide, among other things, the following systems and methods during the life of an IoT/IIoT system:

A means to monitor the trustworthiness of an IoT/IIoT system during the life of the system (e.g., device), regardless of its location A trusted ledger that tracks the trustworthy history of an IoT/IIoT system during the life of the system, regardless of its location Visibility of trustworthiness of an IoT/IIoT system during the life of the system Consistent means for verifiable authenticity of a manufactured IoT/IIoT system during the life of the system Consistent gauge to indicate an IoT/IIoT system trustworthiness (e.g., a score)

A means to reestablish a new trust state after the occurrence of trusted/planned change in state of a IoT/IIoT system The Trust as a Service (TaaS), in accordance with embodiments of the present invention thus establishes an IoT/IIoT system trust at any stage during a system's life cycle, regardless of its location. It also provides an option to establish trust based on a third party ledger system (e.g., a blockchain ledger such as IBM's hyperledger, an IOTA-managed ledger, and/or the like). The IoT/IIoT system and any software installed on the system can be authenticated at any stage. A software agent installed on the IoT/IIoT system provides vital device information and operational statistics. This information may be utilized by the TaaS system (e.g., a TaaS server) to determine the level of trust to be afforded to a particular system.

Some embodiments of the present invention thus provide: 'Trust as a Service' for IoT/IIoT systems; just-in-time fault detection as it pertains to the IoT/IIoT system which is key to predicting problems and recognizing failure patterns with sensors and other IoT/IIoT systems; monitoring selected trustworthiness parameters of a connected IoT/IIoT system during its life cycle; collection of system-specific data (e.g., for auditing, advanced correlation, data science, and/or the like); and/or indicating trustworthiness via a scoring system.

FIG. 1 shows various components of a trust verification system adapted to establish and verify the trustworthiness of an IIoT system (e.g., device, group of devices, factory, warehouse, and/or the like), in accordance with one embodiment of the present invention. The IoT Trust Platform 100 is a connected cloud-based solution that connects to IoT systems to manage the trustworthiness of those IoT systems. In one embodiment, these IoT systems include smart factory solutions. The IoT Trust Platform 100 collects and maintains meta-data associated with manufacturing systems and processes (e.g., including systems and processes usable at various stages in an overall manufacturing process, such as raw material collection, warehousing, one or more production processes, logistics processes, and/or the like), and uses this to provide real time insights, validate process and product trustworthiness, and facilitate trust between supply chain stakeholders.

Manufacturers' IT and Operations systems and personnel 102 can use the platform to gain real-time insights into an IIoT system's behavior. The IoT Trust Platform can monitor network and device resources that connect factory floor systems 108, thereby providing insights into the behavior of manufacturing operations traffic.

In some embodiments, a factory can also support overlaying factory floor sensors 112 that provide additional information about the behavior of factory environment and personnel (e.g. for training purposes, for human productivity and/or safety improvement, and/or the like). In addition, actuators can be used to remotely control factory floor facilities if needed, e.g., to isolate a safety hazard. It is critical that such peripheral devices, and the connecting network operate as expected, within pre-defined boundaries.

In order to address this challenge, embodiments of the present invention provide intelligent agents that are deployed at strategic locations within the peripheral devices and the network, to help monitor and report qualified changes to the IoT Trust Platform 100, so as to supply real time insights into the trustworthiness of the overall system. This data can be provided to manufacturing personnel and systems in real time via dashboards, in the operations center or via mobile apps.

In addition, the IoT Trust Platform 100 can forward this data to a ledger system, such as an immutable blockchain ledger 116 (e.g., a distributed blockchain ledger or a centralized blockchain ledger) in order to establish a trusted, sharable history of events. In some embodiments, the ledger is managed by the operator of the IoT Trust Platform. In another embodiment, the ledger is operated by a third party, such as a third party blockchain ledger (e.g., a private blockchain ledger or a public blockchain ledger). In certain embodiments, the ledger may be a distributed, immutable blockchain maintained by a plurality of distributed computing entities. The IoT Trust Platform can periodically submit selected manufacturing data to the ledger, thus resulting in an immutable ledger of manufacturing related data, thereby enabling, among other things, trusted access to historic data for trouble shooting, as well as auditing 104f for compliance, security, and the like. A blockchain ledger according to various embodiments may be an existing public blockchain service (e.g., IBM's Hyperledger server) or a private blockchain specifically dedicated for tracking IoT trust. The blockchain ledger may be a distributed system maintained by a plurality of nodes configured for maintaining trustworthiness, validity, and consistency between the blockchain data stored at each of the plurality of nodes. The ledger can also be accessed by different supply chain stakeholders 118, which provides mutual validation and consistency to the blockchain ledger, process transparency, and the like.

In some embodiments, the IoT Trust Platform 100 can be used to manage and verify the trustworthiness of electronic devices (or other systems) during their life cycle. In such embodiments, manufacturers 102, OEM vendors 106, and application developers 110 can use the platform to securely submit hashes of device/product artifacts to the ledger, and/or verify the authenticity of manufactured IoT devices 114 as they proceed through their respective life cycles. As a result, device/system users 120 and other stakeholders can use the system to validate the trustworthiness of a given IoT device and/or other system.

Figure 2:
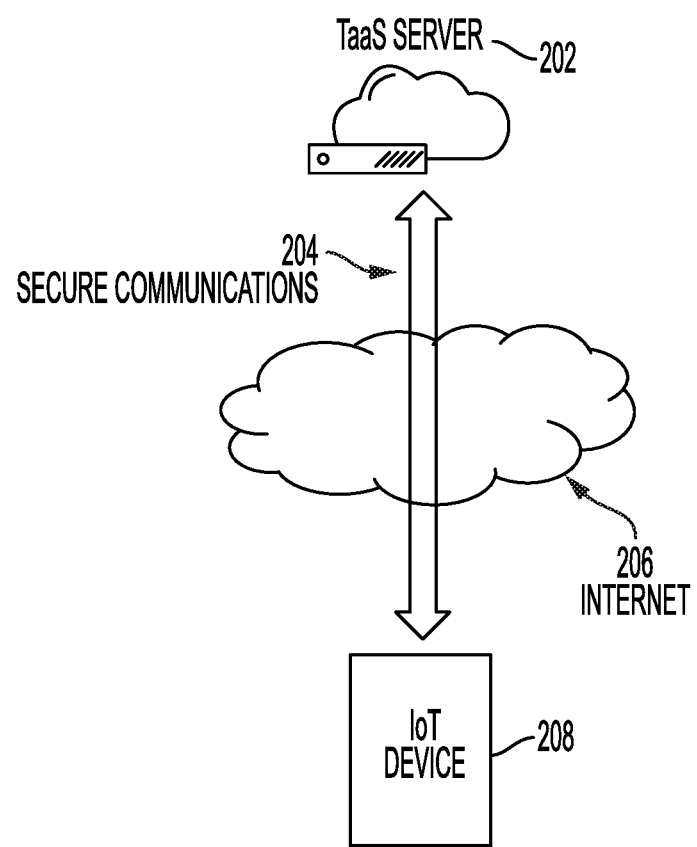
FIG. 2 depicts an exemplary system trust architecture in accordance with one embodiment of the present invention.

FIG. 2 shows an IoT or IIoT system 208 (collectively and alternatively referred to herein as device system) in communication with a Trust as a Service (TaaS) server 202, in accordance with one embodiment of the present invention. Specifically, system 208 may be embodied as an individual device in certain embodiments. System 208 can connect to TaaS server 202 via the internet 206 during different/all stages of its life cycle.

In one embodiment the IoT/IIoT system can reside on a factory floor (during its manufacturing phase) and can establish a secure communication channel 204 from the factory floor network to TaaS Servers 202 via internet 206 (and/or other networks). For example, the IoT/IIoT systems may comprise IoT-enabled manufacturing robots, IoT enabled position sensors, IoT enabled temperature sensors, IoT enabled pressure sensors, and/or the like. In other embodiments, a manufacturing system utilized in manufacturing the IoT/IIoT system may establish a secure communication channel 204 on behalf of the IoT/IIoT system, thereby providing measured data of the system being measured. In such embodiments, the secure communication channel 204 flows through the manufacturing system (which also may be configured for generating the measured data of the monitored system based at least in part on sensed characteristics of the system being measured). In another embodiment, the system can be deployed in the field and connected to the TaaS server 202 via its associated gateway and various internet communication options.

Figure 3:
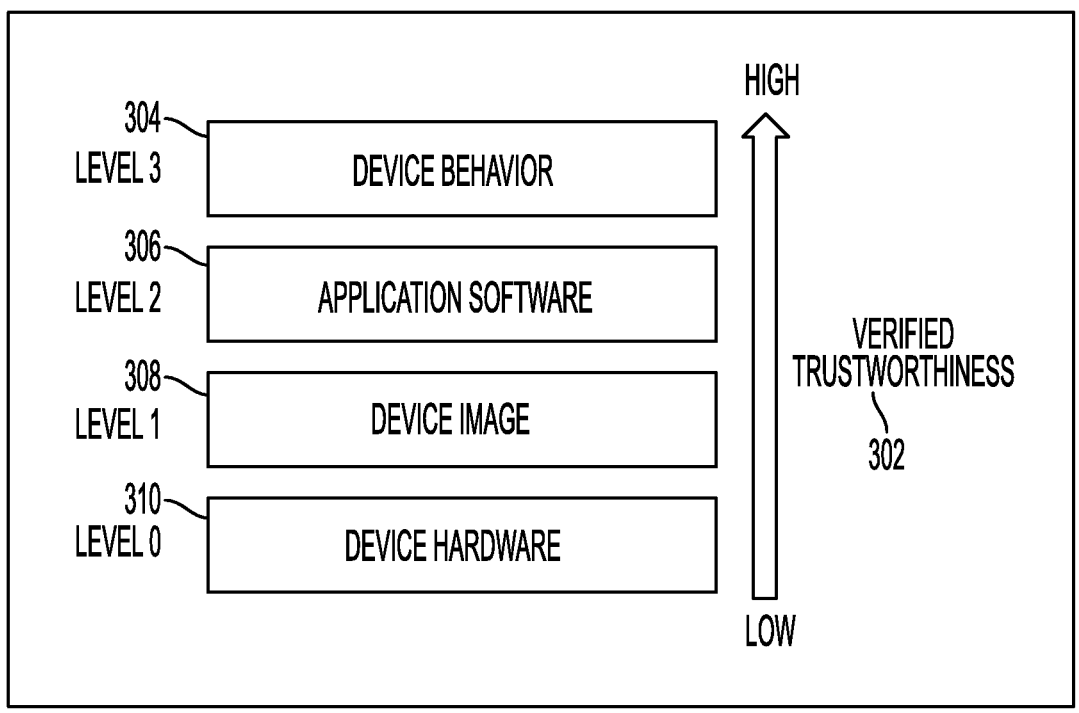
FIG. 3 shows various trust levels of a system in accordance with one embodiment of the present invention.

FIG. 3 depicts a model for representing various levels associated with the trustworthiness of a system, in accordance with one embodiment of the present invention. The trustworthiness level 302 of a system can be verified at different levels, with increasing confidence as more levels are verified. Although the included illustration focuses on determining the trustworthiness of a device, it should be understood that the systems, methods, and configurations discussed herein may be usable for determining the trustworthiness of any system, such as a group of devices, a production line, a production bench, a factory, a warehouse, and/or the like.

In one embodiment, a trustworthiness verification model may include 4 levels, as shown below:
Level 0=System hardware 310 (the lowest level)
Level 1=System Operating System Image 308
Level 2=Application Software installed on the system 306
Level 3=System behavior 304 (the highest level)

These levels can be verified by the TaaS server (see FIG. 2) over the internet, at various stages of a system's life cycle. These levels may be verified based on monitoring of system and/or software artifacts of the system that are expected to exhibit predictable attributes at various times. Such attributes may be variable and may be dependent on time (e.g., the attributes of a particular artifact change as a function of time) or the attributes may be expected to remain static (e.g., the attributes of a particular artifact remain constant over time). Deviations from the expected artifacts may be indicative of a malfunctioning system, a compromised system, or a system exhibiting other symptoms that diminish the trustworthiness of the system.

The trustworthiness of a system may be established along a gradient between a least-trustworthy level and a most-trustworthy level, with scores provided that are indicative of the relative level of trustworthiness of a system between the least- and most-trustworthy levels. When verified, the TaaS server can indicate this level via the scoring system either for each layer individually or in aggregate. In one embodiment, the score can be made available via an API of the TaaS server to be provided to a user's device (e.g., via one or more software applications operating on the user's device). In another embodiment, the score can be visualized on an operator's dashboard.

Depending on the extent of integration with the TaaS server, a system's trustworthiness can be verified at all levels, or at a subset of the defined levels. For each level, a specific set of required attributes associated with a respective level can be reported by the system (e.g., via a software agent installed on the system), either periodically or whenever changes are detected. When received, these attributes may be used by the TaaS server to assess the system's trustworthiness. When registered with the TaaS server or service, the system is expected to report all qualified changes in order to avoid any gaps, and such reported changes may be stored via the ledger (e.g., blockchain) or other storage mechanism. Failure to report changes can affect the confidence in the assessed trustworthiness of the system.

Table 1 below shows example life cycle stages of a system, together with actions involved in each of those life cycle stages that may result in the generation of data indicative of various attributes of the system that may be indicative of changes to the trustworthiness of a particular system.

TABLE 1

| STAGE | ACTIONS |
|---|---|
| 1. Development | Build IIoT system application software artifacts |
| | Fingerprint and establish software artifact identity |
| 2. Manufacturing | Establish trust on hardware system |
| | Establish trust on operating system |
| | Install application software artifacts on IoT/IIoT system |
| | Fingerprint OS and software artifacts bundled on a specific hardware system. Establish overall system identity with its pre-installed software. |
| 3. Ship | Track vendor and customer system and software artifact inventory |
| 4. Deploy | Update customer system inventory |
| | Verify system and software authenticity |

TABLE 1-continued

| STAGE | ACTIONS |
| --- | --- |
| 5. Operate | Periodically verify system authenticity<br>Monitor system behavior |

The integration and establishment of trust at such stages as development, manufacturing, shipping, deployment, and operational stage increases the system trustworthiness. Depending on the level of trust desired, users can integrate, establish and verify trust at all or any stage.

For each stage in the process, an agent, as described in detail in U.S. Application No. 62/611,508, may collect and report the associated artifacts to the TaaS server, where software attributes are fingerprinted and securely stored to a trusted ledger for future reference. An artifact is understood to refer to system software, application software components and associated configuration files that define an application and/or are indicative of physical system attributes (e.g., firmware of a device may comprise data indicative of a CPU brand/model within the device). In one embodiment, artifacts may include software binaries, libraries, debian or rpm distribution files, container image, system image and configuration files, and the like. A system can be registered to report artifacts associated with all or a subset of its life cycle stages. Only when registered, such artifacts will be reported, hashed, and stored. The presence of a given stage may depend on different factors such as, for example, connectivity, subscribed trust service model, and the like.

Figure 4:
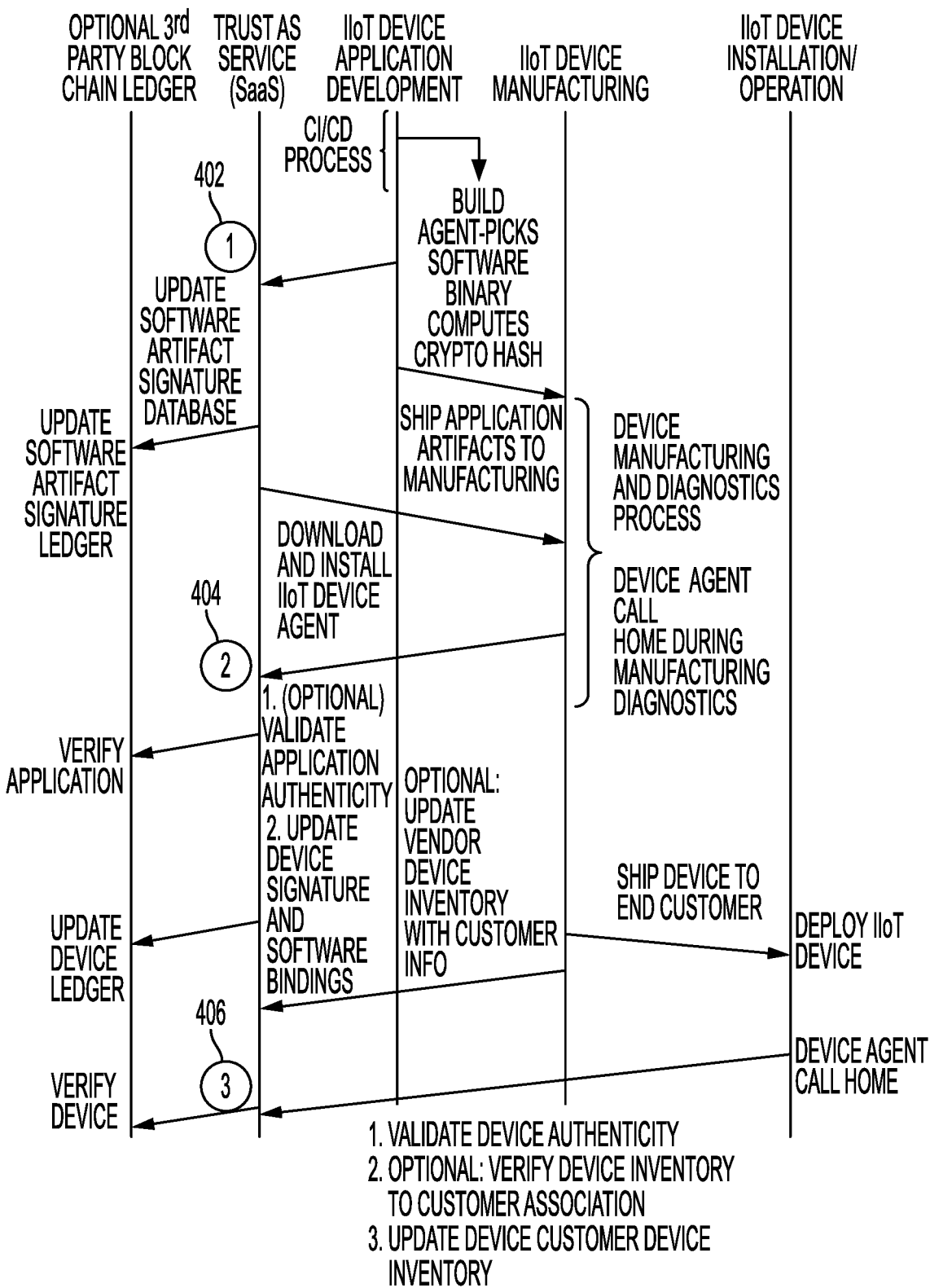
FIG. 4 is a flow diagram for establishing trust at development and manufacturing stage in accordance with one embodiment of the present invention.
Figure 5:
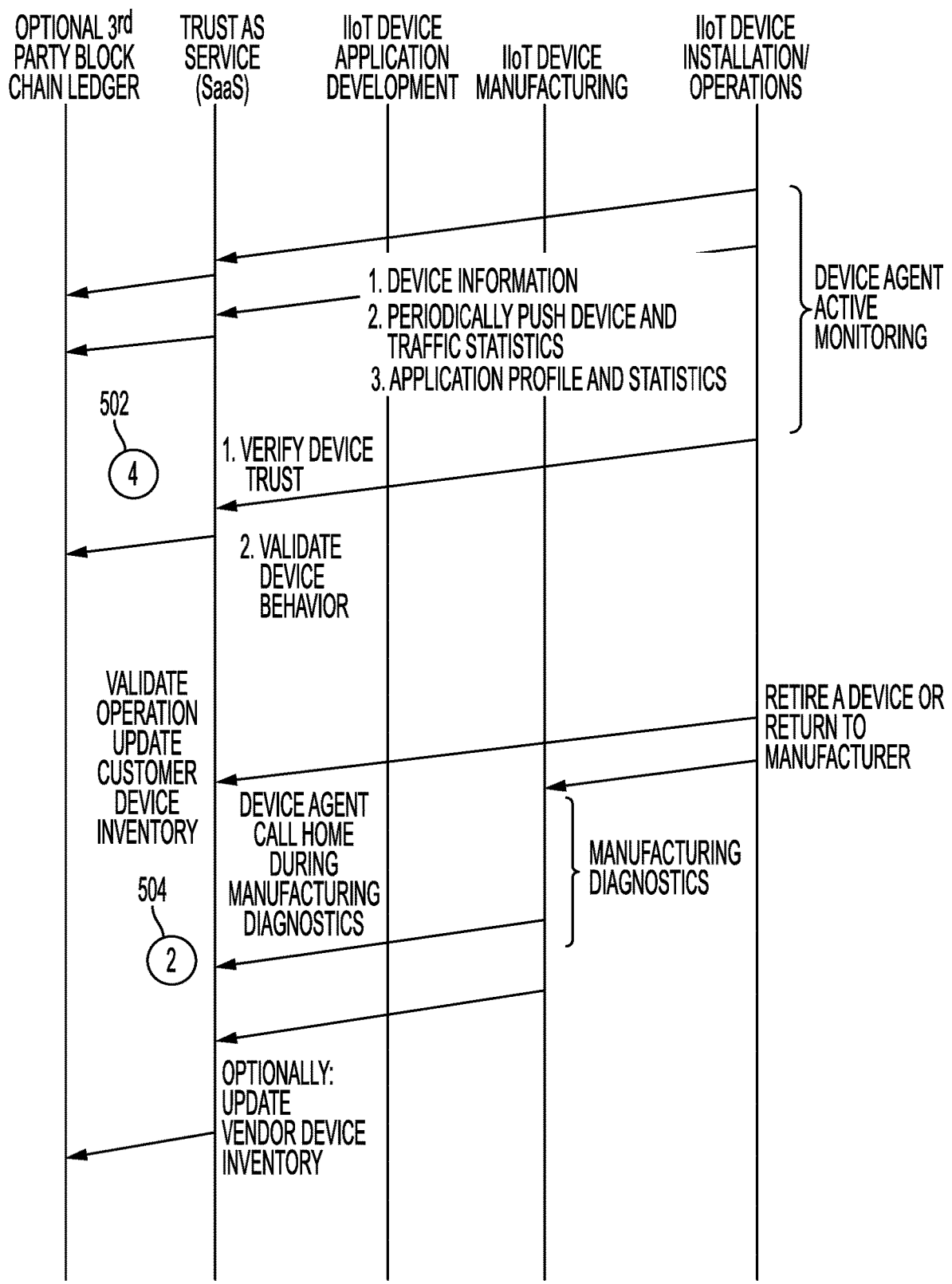
FIG. 5 is a flow diagram for establishing and maintaining trust during operations and life cycle of a system in accordance with one embodiment of the present invention.
Figure 6:
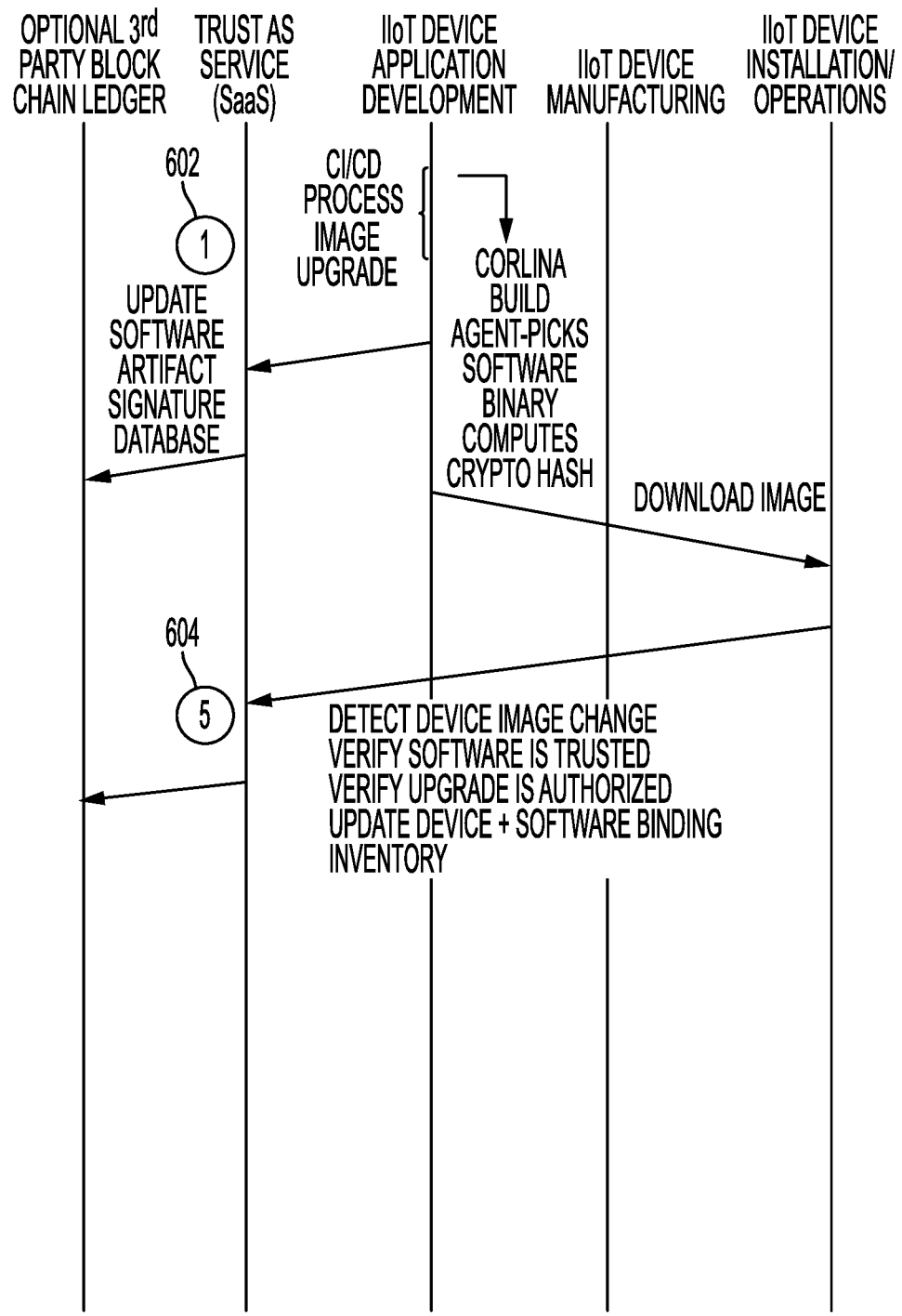
FIG. 6 is a flow diagram for establishing and maintaining trust during upgrade process of a system in accordance with one embodiment of the present invention.

FIGS. 4, 5, and 6 collectively illustrate work flows for establishing and maintaining trust during various stages of a system's life cycle. In one embodiment, establishing and maintaining system trust involves the following actors:

System Trust Platform (TaaS server and/or blockchain ledger)
System software/system application developer
System manufacturer
System consumer (user)

In one embodiment, the above actors (e.g., user, manufacturer) may be within the same administrative domain. In another embodiment, the actors may be in multiple administrative domains (different business units within an organization or multiple organizations). The work flow diagrams highlight how the Trust verification service can be integrated with each of these actors, and how trust can be established at various stages of a system's life cycle.

FIG. 4 is a flow diagram for establishing system trust at the development and manufacturing stages, in accordance with one embodiment of the present invention.

Establishing Application Trust 402

The system application developer may use the trust verification service Build Agent to establish software trust. Software trust may be established during the process of installation of software to the system. The software may comprise system-specific attributes, such as device-specific license keys, device-specific features, and/or the like which are unique to the particular system on which the software is installed. Such system-specific features may be affirmatively established (e.g., by establishing a device-specific software license key) or naturally established (e.g., by determining characteristics of the software that are directly influenced by specific features of the device hardware, such as software start-up delay times (e.g., measured in msec) that may be influenced by the device hardware). The Build Agent profiles the software artifacts, generates a cryptographic hash and updates the database. In certain embodiments, the software artifacts may be indicative of specific characteristics of a software binary installed on a particular device, such that the software artifacts may be utilized to uniquely identify a particular system, even among other systems having other copies of an identical software configuration installed thereon. The one or more profiles established by the Build Agent for a particular system establishes a non-varying baseline trust level for the system (which may be changed to update trusted profile characteristics as discussed herein).

The software itself is installed on the system and, once the system is sufficiently functional to connect to the internet (or another network), the software causes the system to transmit the artifacts to the TaaS server, which updates the database to reflect an association between the artifacts and the identity of the particular system. In other embodiments, the TaaS server updates a third party blockchain ledger (an immutable ledger) to reflect the association between the software artifacts and the identity of the particular system, such that any changes to those software artifacts that arise later may be easily identified as distinguishable from the previously stored software artifacts.

The software may then be installed on the system, as indicated in FIG. 4, such that the particular system (which is associated with a particular device identification) reflects the software artifacts identified and stored by the TaaS server.

Establishing Trust During Manufacturing 404

The system agent, which may form a part of software (e.g., an operating system) installed on the system, or the system agent may be a separate software and/or firmware system that may be pre-installed and bundled with the system. The system manufacturer can verify and authenticate the software installed during system diagnostics process (e.g., via the device agent). During diagnostics, the system agent can profile the system and software installed on the system. The agent updates the system database with cryptographic hash that can be used for authenticating and verifying the system during installation by transmitting data regarding the system itself, including, for example, a system signature (e.g., indicative of various hardware components physically installed in the system) to the TaaS server, which may update the appropriate database and/or ledger (e.g., blockchain ledger) to reflect the additional data generated during the system manufacturing process. Like the software concepts discussed above, the data generated during manufacturing may be stored in association with the system identifier, thereby enabling the system characteristics to be utilized together with the previously identified system software artifacts to verify the trustworthiness of the system.

System Verification 406

In certain embodiments, the agent installed on a system has an integrated functionality for automatically establishing a communication channel with the Software as a Service (SaaS) server upon initial start-up. On system boot, the agent is automatically initialized and the agent connects to the SaaS server. In certain embodiments, the agent establishes a secure connection (e.g., HTTPS connection) with an API accessible at a known URL (e.g., prepopulated with the agent during software installation) linking to the SaaS server. The agent forwards system and software profile data to the SaaS server via the established communication (e.g., providing a unique identifier, license information/data and/or the like within a message transmitted from the system to the API available at the known URL). The SaaS server verifies the system and software authenticity. For example, the SaaS server compares data (e.g., indicative of software artifacts and/or device characteristics) received from the system against previously stored data associated with the system. Upon determining the data is consistent with previously stored data, the system's trustworthiness may be indicated as high (e.g., by providing data from the TaaS server to a user's computing device for display via a dashboard). Moreover, upon connecting the system to the internet at a customer's location, the customer's system inventory is auto populated. Based at least in part on unique identifier data and/or unique license data associated with the system (which may have been associated with a particular customer during installation of the software on the system), the SaaS server identify a customer associated with the system to update the customer's system inventory. A customer can further group the system into one or more groups for administrative convenience.

FIG. 5 is a flow diagram for establishing and maintaining system trust during the operations stage, in accordance with one embodiment of the present invention.

Periodic Monitoring 502

An agent, as described in detail in U.S. Application No. 62/611,508, periodically updates system statistics by pushing network traffic, memory, CPU statistics, and/or the like to the SaaS server (e.g., via the API accessible at the known URL). The agent monitors system file systems, volumes, service restarts and watches for any attached system changes. It periodically validates system authenticity to ensure the system has not been breached during operation or deviated from its typical behavior. Such validation may be performed locally at the agent by comparing stored data against data generated by the agent, or the validation may be performed in combination with the TaaS server. In the latter embodiments, the agent may cause the system to transmit data indicative of the various system behaviors to the TaaS server, which may compare the received data against validation data stored in the database and/or the blockchain ledger to determine whether any discrepancies exist. Upon determining that the data provided from the system (via the agent) satisfies applicable trustworthiness criteria (e.g., the data generated at the device has less than an acceptable number of discrepancies), the agent and/or the TaaS server may determine that the system remains trustworthy and has not been compromised during use.

Return to Manufacturing 504

In certain embodiments, when a system (e.g., a device) is returned to manufacturing, the manufacturer can verify that the system has not been tampered with by verifying the system's hardware and/or operating system fingerprint (or particular hardware, software, or operating system characteristics of the system). Further, the customer inventory database can be checked for system ownership and updated to reflect that the system has been returned. The system can be re-imaged and/or fingerprinted again as described above in "Establishing Trust during manufacturing 404" of FIG. 4, before shipping the system to the same or another customer.

FIG. 6 is a flow diagram for establishing and maintaining system trust during a system upgrade process in accordance with one embodiment of the present invention.

Application Update 602

The agent tracks application software updates. Any new software builds are fingerprinted, profiled and tracked by the trust service as described above and in detail in U.S. Application No. 62/611,508.

Software updates applied to a system may change tracked characteristics of the system, and under typical circumstances as discussed herein, these software updates may render the system less trustworthy. However, according to various embodiments, the SaaS server may be configured to accept input (e.g., user-provided input and/or automatically generated input) providing details of the updated software to update the system's baseline trust profile to maintain a consistent level of trust in the system during known/expected software update processes. For example, the TaaS server may be configured to accept user input (e.g., provided by a software developer) via an API (e.g., accessible via a known URL), a webportal (e.g., a Software as a Service portal, as discussed herein), and/or the like. The user input may update various known/tracked software artifacts associated with a particular device (e.g., binary file size, MD5 checksum, and/or the like). These software updates may be incorporated into the baseline trust profile for the system, such that later data provided from the system (after the software update takes effect on the system) is compared against the updated baseline trust profile to determine the trustworthiness of the system. Because the baseline trust profile reflects characteristics of the software update, the level of trust attributed to the system remains unchanged as a result of the software update, despite the changes made to the system relative to the original baseline trust profile.

As mentioned, changes to the system's baseline trust profile may be made in response to user input and/or automatically. Because these changes are made at the TaaS server, without receipt of data from the system itself, the changes may be indicative of whether the software update was authorized for a particular system. Thus, changes to the system's baseline trust profile to reflect updated software are only made when those software updates are authorized, thereby indicating that trust afforded to a particular system is unaffected by the software update only when that software update was authorized for the system. By extension, if a software update was authorized for the system, and later data received from the system indicates that the software update was not carried out, this may be indicative of a diminished level of trust in the system, and the trust level attributed to the system is accordingly diminished to reflect the difference between the expected, upgraded software on the system and the actual, non-upgraded software on the system.

System Upgrade 604

When a customer updates the software on the system, the agent detects the change in software characteristics. The agent pushes data indicative of the new software characteristics (e.g., embodied by a new software profile) for the TaaS server to validate the authenticity of the new software. If the software upgraded is not trusted or system upgrade was not authorized (as discussed above), the TaaS server can trigger a user alert. In one embodiment, the TaaS server includes, in part, three components, namely (i) Software as a Service Portal, (ii) Build Agent and (iii) system agent, as described further below.

Figure 7A:
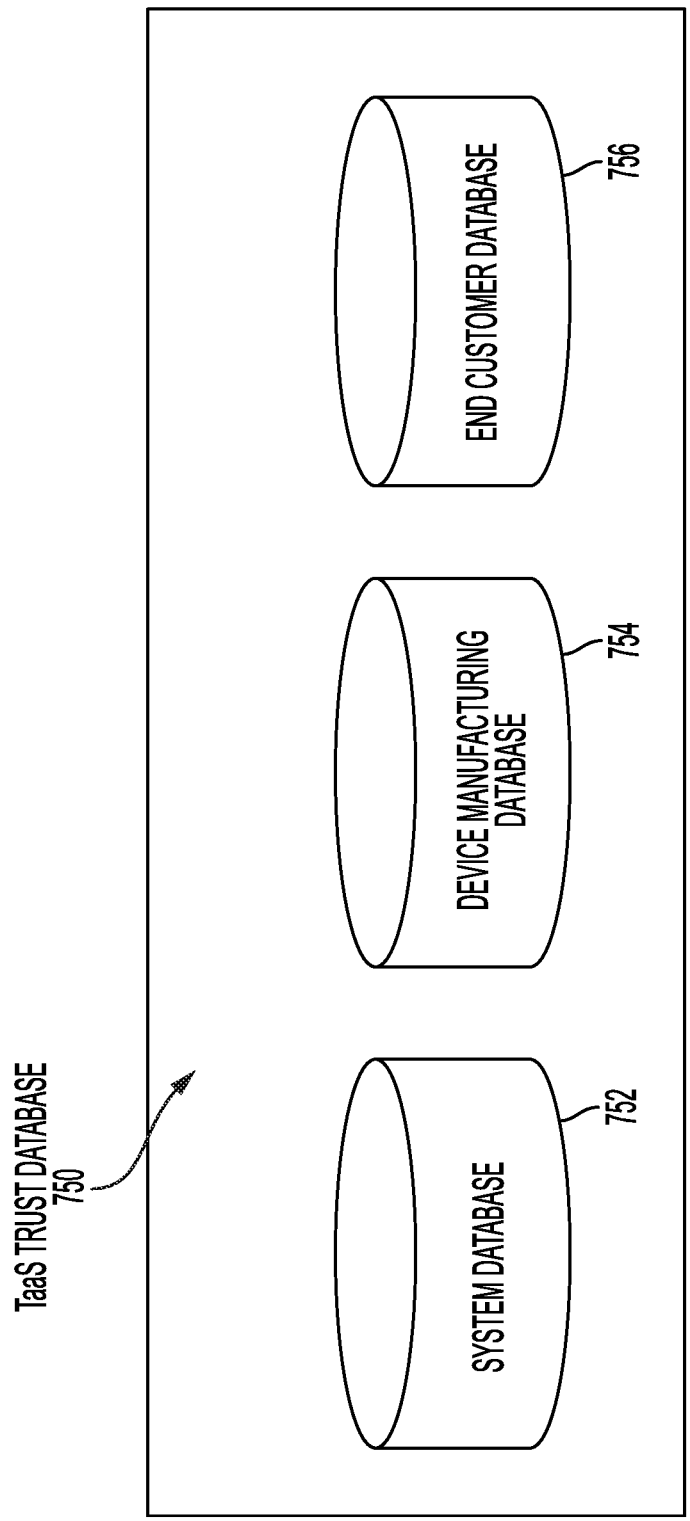
FIG. 7A shows various modules of a system trust database associated with the components of the Trust as a Service (TaaS) system, in accordance with one embodiment of the present invention.

FIG. 7A shows various modules of a system trust database 750 associated with the components of the Trust as a Service system, in accordance with one embodiment of the present invention. System Database 752 is a repository of all software components, such as software images, and the like. System manufacturer database 754 maintains per manufacturer system information, such as system and associated image, customer leasing/owning the system, and the like. End customer (User of IIoT system) database 756 maintains information associated with the IoT/IIoT user, system/software statistics and builds behavior information. End customer database 756, among other things, also tracks system owned, system image, systems deployed, software application installed on the system, system configuration, operational state of the system and supplication.

Software as a Service Portal

The Software as a Service provides a portal to manage the system software signature and system inventory, as well as to monitor the system operation. The portal is a component in establishing trust and interfaces with the blockchain provider to maintain an independent ledger of software and system fingerprint (e.g., which may comprise and/or be embodied as a system identifier).

The Software as a Service depends on the build agent and system agent to establish trust at various stages of the system's life cycle. The Software as a Service maintains various databases, such as those shown in FIG. 7B.

A software vendor database 702 may be configured to store a vendor certificate indicative of a vendor providing the software for installation on a system. The software vendor database 702 may further comprise a system software artifacts database configured to maintain a software name, metadata associated with the software and/or the software's cryptographic signature. The software vendor database 702 may, in certain embodiments, be in further communication with a software image inventory database 704, which may store data indicative of an inventory of software images (e.g., each image may be installed on a particular system) associated with a particular vendor and/or customer. In certain embodiments, particular software images may be assigned particular inventory control identifiers that may remain constant for the software image, and thereby may be monitored to identify any unexpected changes in the inventory control identifier associated with a particular software image. Such data stored in each of the software vendor database 702 and/or the software image inventory database 704 may be utilized to establish and/or maintain trust with a particular system by determining whether a particular system provides consistent data regarding the system's original vendor and/or inventory control identifier.

Figure 7B:
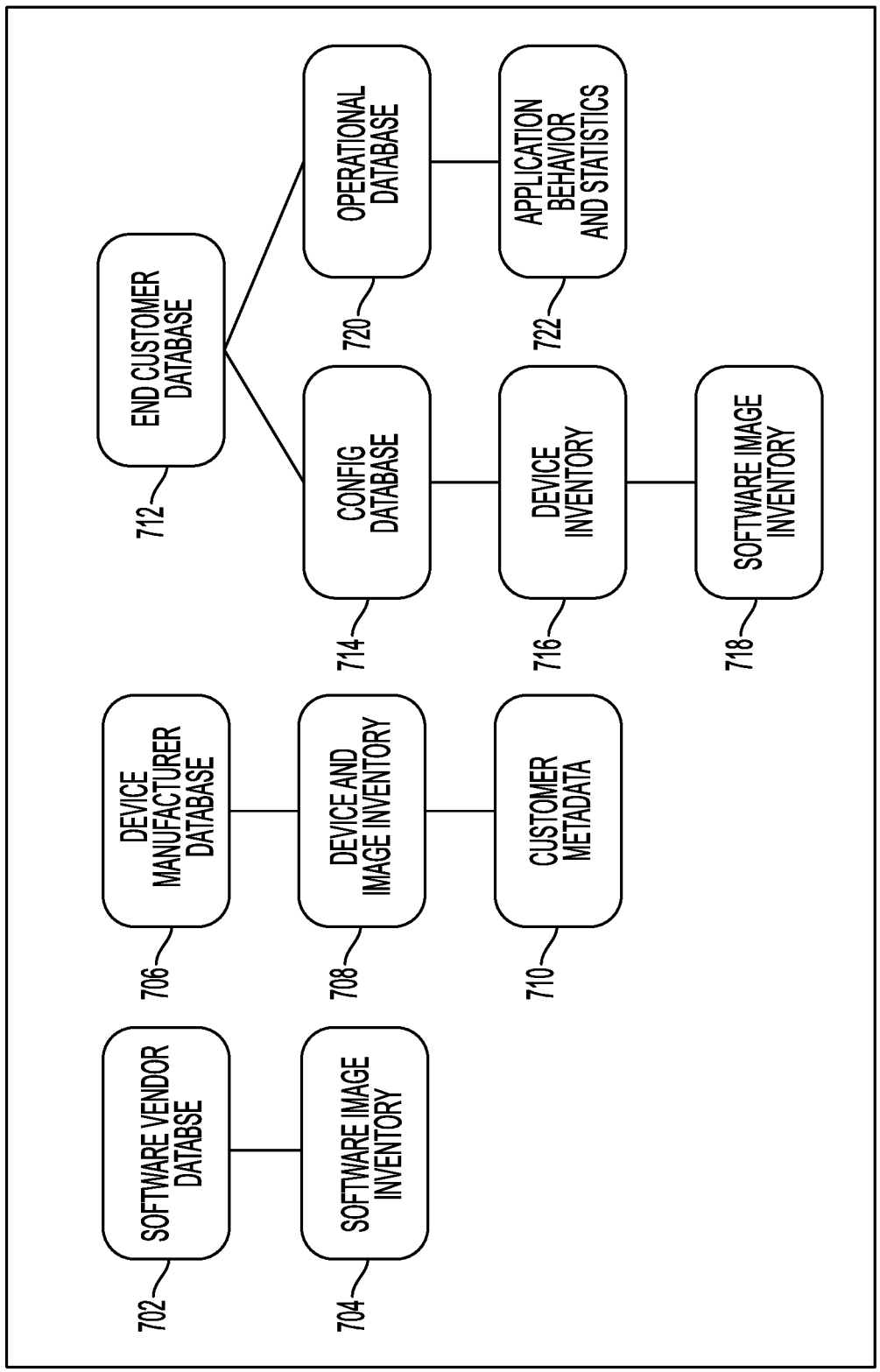
FIG. 7B is a block diagram of a TaaS system users in accordance with one embodiment of the present invention.

The system manufacturer database 706 may store data indicative of various manufacturer certificates that may be associated with one or more systems. Such manufacturer certificates may be referenced when determining whether a particular system's manufacturer certificate is genuine. The system manufacturer database 706 may be in further communication with a system and image inventory database 708 and/or a customer metadata database 710, as indicated in FIG. 7B. The system and image inventory database 708 and the customer metadata database 710 may be configured to maintain system identifiers for particular systems, as well as metadata associated with those systems, respectively. The system and image inventory database 708 and the customer metadata database 710 may be further configured for storing a cryptographic hash of the various system, image, inventory, and/or customer metadata that may be utilized for comparisons against data generated later by the system to verify the trustworthiness of the system.

Moreover, the end customer database 712 may be configured for storing client certificates therein that may be utilized to verify that a system is operated by an expected client. The end customer database may be further in communication with various system databases storing data indicative of various systems. For example, a configuration database 714 may store data indicative of particular system configurations in use by a customer (each of which associated with a specified system). Such system configurations may further comprise and/or may be indicative of various combinations of software installed on the systems, and such data may be stored as a cryptographic hash in certain embodiments. Moreover, the system databases may comprise a software image inventory database 718, which may store data indicative of various system image characteristics of particular systems, system filesystem fingerprinting characteristics, system attached to IIoT system inventory data (e.g., providing linking data between particular software images and the systems on which the software is installed).

Moreover, the end customer database 712 may comprise and/or may be in communication with various statistics and operational databases, such as operational database 720 that is configured to store data indicative of application's behavior, such as network traffic behavior involving the system, network traffic volume involving the system, running processes statuses for the system, and/or the like. Moreover, the application behavior and statistics database 722 may store data indicative of similar operational characteristics provided for specific software applications operating on the system, such that network behavior, network traffic, and/or the like may be monitored for each software application operating on a particular system.

Build Agent

The build agent integrates with the system software development block to build a cryptographic signature of various software artifacts that can be installed on the system. The build agent resides on a build system. The build agent can be auto triggered as part of the CI/CD/build step. As an example, it can be integrated into Jenkins pipeline or any other equivalent build/release pipeline. Alternately the build agent can be manually run by a developer as a final step during the system software development process.

The build agent computes a cryptographic hash using a certificate issued to the system application software developer. The hash is computed on the software image. The image may be any one of the following types: executable binary; an archive file such as Tar, zip or gzip; a Debian file (.deb); a RPM file (.rpm); a container image; and/or the like.

In certain embodiments, the build agent interfaces with the TaaS Server to publish, among other things: one or more cryptographic hash; a software image name; a software image type; a software image size; a build version; and/or the like.

TaaS Service maintains a database of the system software artifacts along with its cryptographic hash. For additional security, the TaaS also provides a blockchain based ledger to validate the system software components. The system software artifact signature can be maintained in a blockchain ledger.

The System Agent

The system agent as discussed herein is a software module that runs on the system (e.g., on a particular system). In one embodiment, it can be a daemon that runs on any standard operating system (e.g., Linux) distribution. The agent may be installed during and/or immediately following hardware manufacturing of the system and/or during initial setup of the system while at the system manufacturer. Alternatively, the agent may be downloaded to the system after manufacture (e.g., while the system is within the possession of the customer/final user). The agent may be installed onto the system using a secured boot sequence (e.g., using a Trusted Platform Module (TPM)) to provide a maximum level of trust for the system. Installing the agent using TPM enables agent certificate and/or system software to be encrypted. The agent monitors the system and periodically communicates with the SaaS portal. The agent is responsible for collecting system signature for establishing and maintaining the system trust. The agent monitors various attributes of the system. Such attributes may be divided into the following two categories:

1. Trust Attributes
2. Behavior Attributes

Trust Attributes

In one embodiment, an agent installed on the system collects data regarding various system characteristics, software characteristics, system behavior and/or the like to establish a baseline against which later data collections may be compared to establish trust. For example, an agent installed on the system may be configured to collect data indicative of various software component image attributes, including, for example: image name; image size; image version; installation date; image MD5 hash; and/or the like. The agent may be configured to collect data indicative of various system software profiles, such as system volumes; filesystem hash (e.g., /etc, /usr, /bin, /sbin, and/or the like); system profile (e.g., systemctl status); and/or the like. The agent may be configured to collect data indicative of various system profiles, such as a CPU type installed in the system; a machine ID associated with the system (e.g., a unique system id); a memory size of the system; various auxiliary systems attached (e.g., via USB or other connector) to the system; and/or the like.

The agent may be configured to collect any combination of the above trust attributes and/or other unlisted trust attributes. Such listing should be constructed as listing various examples only, and should not be construed as limiting.

Behavior Attributes

Moreover, the agent may monitor, among other things, various attributes to profile the system behavior. Such monitored attributes may be utilized to establish trust as well. In such embodiments, the agent may establish baseline behavior attributes (e.g., indicative of determined typical system behaviors) against which later data collections (indicative of later system behaviors) may be compared to determine whether the system is exhibiting behaviors that deviate from the baseline behavior attributes.

For example, various system behaviors monitored by the agent may comprise: application socket binding; application connection tracking (e.g., monitoring endpoints with which an application communicates; quantity of packets and/or bytes transmitted over an interface; and/or the like).

System Users

Figure 8:
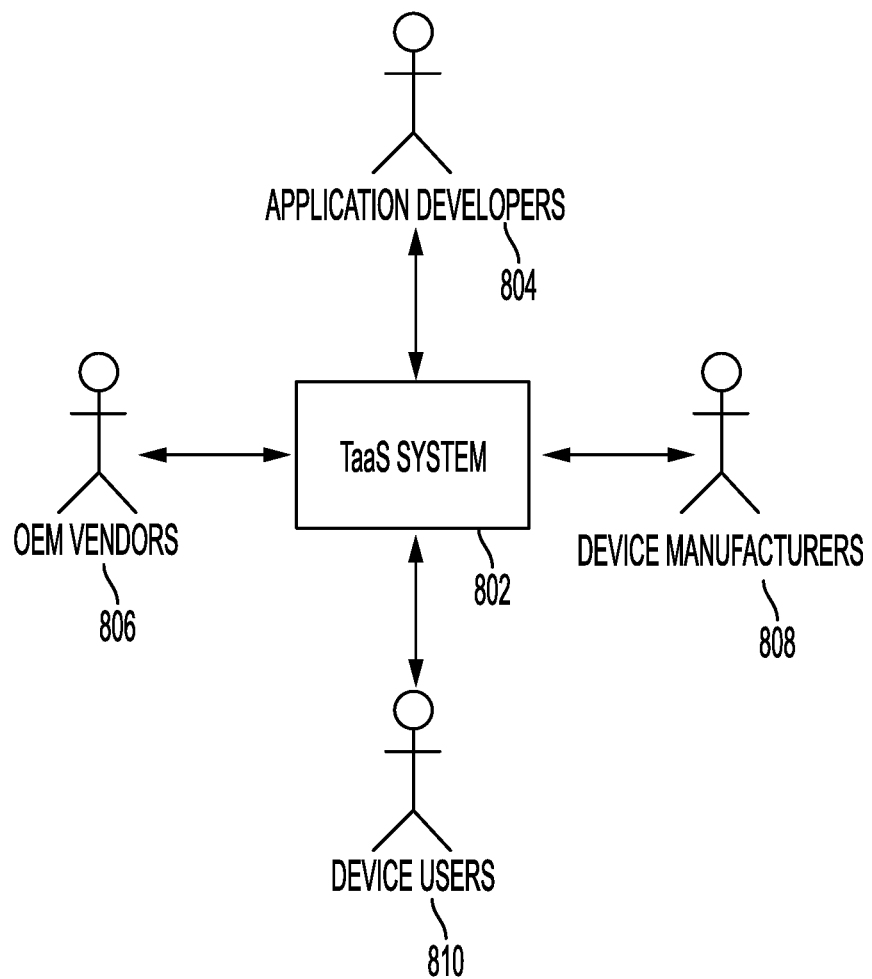
FIG. 8 is a block diagram of an exemplary database in accordance with one embodiment of the present invention.

FIG. 8 is an example of the different users of the TaaS System 802. The users may comprise system application software developers 804 and the TaaS server is configured to enable those software developers 804 to register with the TaaS server to provide data to the TaaS server regarding specific systems. The data provided by the software developers (e.g., provided as user input) may be utilized to establish and/or evaluate a level of trust for the system. The developers 804 may provide data regarding various software components that may be installed on various systems, thereby enabling the TaaS System 802 (which may comprise the TaaS server 100 discussed herein) to establish baseline trust values for the software provided by the developers 804.

As noted in FIG. 8, the users may further comprise OEM Vendors 806, who may register with the TaaS Service to build system inventory and establish system hardware and software trust; system manufacturers 808, which may register with the TaaS Service to build system inventory and establish system hardware and software trust; and/or system users 810, which may register with the TaaS Service to verify system authenticity and trust. In certain embodiments, these users may provide TaaS System-related services as an optional service provided at a premium for end users. End customers can use the TaaS Service system behavior analytics to monitor system and maintain trust.

System Components

Figure 9:
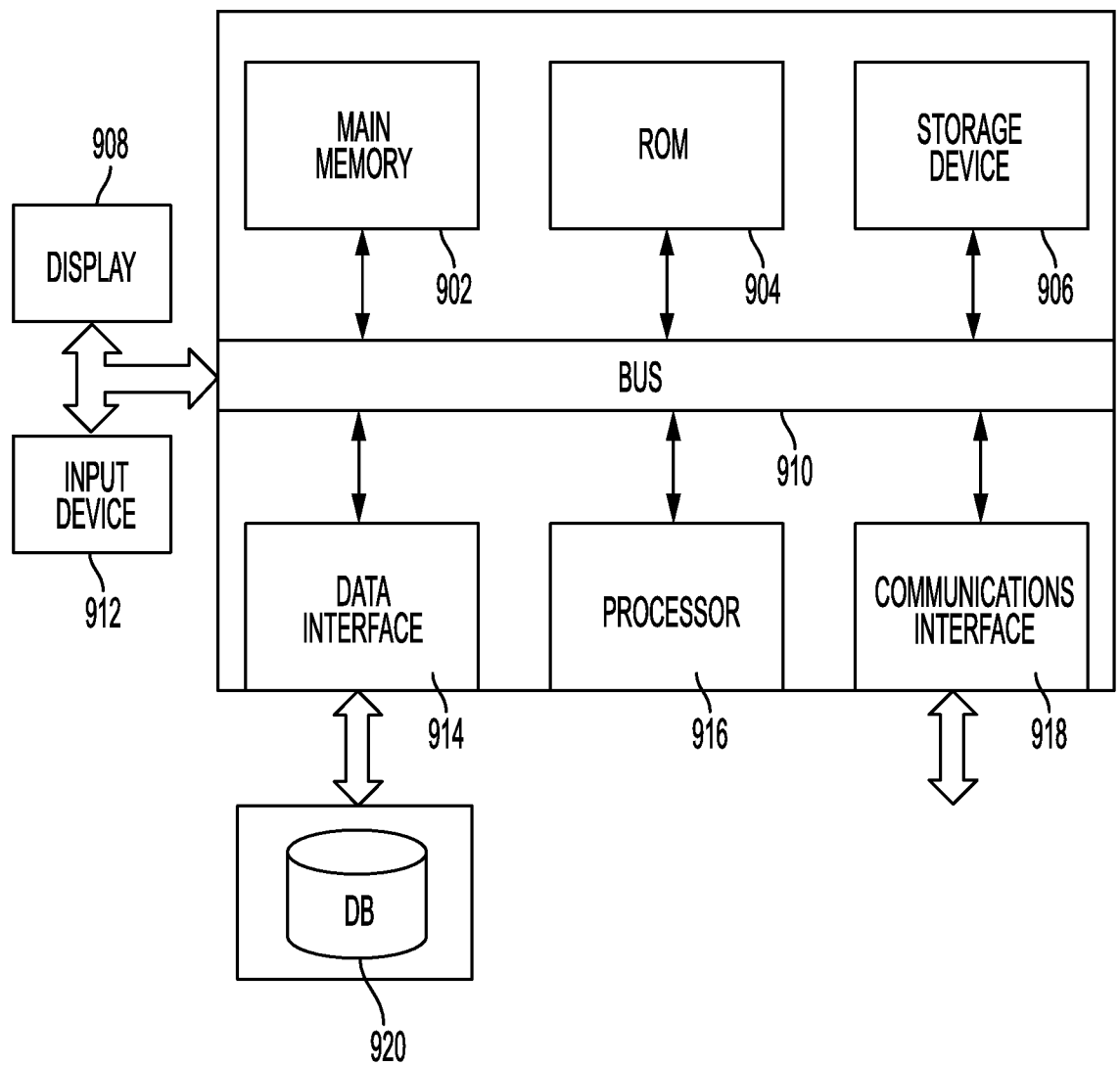
FIG. 9 is a block diagram of a computer system, according to an embodiment of the present invention.

FIG. 9 shows various components of a computation/communication system in which various aspects of the present invention may be embodied.

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps, operations, or processes. Thus, embodiments of the present invention may also take the form of an entirely hardware embodiment, an entirely computer program product embodiment, and/or an embodiment that comprises combination of computer program products and hardware performing certain steps, operations, or processes.

Embodiments of the present invention are described herein with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps, operations, or processes specified in the block diagrams and flowchart illustrations. Accordingly, the block diagrams and flowchart illustrations support various combinations of embodiments for performing the specified instructions, operations, or steps.

With reference again to FIG. 9, the computation/communication system may encompass, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As shown in FIG. 9, in one embodiment, the computation/communication system may include or be in communication with one or more processors 916 (also referred to as processing elements, processing circuitry, and/or similar terms used herein interchangeably) that communicate with other elements within the computation/communication system via a bus 910, for example. As will be understood, the processors 916 may be embodied in a number of different ways. For example, the processors 916 may be embodied as one or more complex programmable logic devices (CPLDs), microprocessors, multi-core processors, coprocessing entities, application-specific instruction-set processors (ASIPs), and/or controllers. Further, the processors 916 may be embodied as one or more other processing devices or circuitry. The term circuitry may refer to an entirely hardware embodiment or a combination of hardware and computer program products. Thus, the processors 916 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processors 916 may be configured for a particular use or configured to execute instructions stored in volatile or non-volatile media or otherwise accessible to the processors 916. As such, whether configured by hardware or computer program products, or by a combination thereof, the processing element 205 may be capable of performing steps, operations, or processes according to embodiments of the present invention when configured accordingly.

In one embodiment, the computation/communication system may further include or be in communication with a non-volatile media (also referred to as non-volatile storage, memory, memory storage, memory circuitry and/or similar terms used herein interchangeably). In one embodiment, the non-volatile storage or memory may include one or more non-volatile storage devices or memory media, such as a main memory 902, ROM 904, storage device 906, and/or the like. Various of these storage media may be embodied as hard disks, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage device 906 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that may be stored in a computer-readable storage medium, such as via a relational database, hierarchical database, and/or network database.

Storage device 906 may also be embodied as a data storage device or devices, as a separate database server or servers, or as a combination of data storage devices and separate database servers. Further, in some embodiments, storage device 906 may be embodied as a distributed repository such that some of the stored data may be stored centrally in a location within the system and other data may be stored in one or more remote locations. Alternatively, in some embodiments, the distributed repository may be distributed over a plurality of remote storage locations only. As a person of ordinary skill in the art would recognize, the data required for the operation of the analytic computing entity may also be partially stored in the cloud data storage system and partially stored in a locally maintained data storage system.

Moreover, the computation/communication system may further comprise a data interface 914, which may enable the computation/communication system to communicate with one or more separate databases 920, such as the TaaS Trust Database 750 discussed herein, which encompasses a system database 752, device manufacturing database 754, and/or end customer database 756.

As indicated, in one embodiment, the computation/communication system may also include one or more network and/or communications interfaces 918 for communicating with various computing entities, such as by communicating data, content, information, and/or similar terms used herein interchangeably that can be transmitted, received, operated on, processed, displayed, stored, and/or the like. For instance, the computation/communication system may communicate with one or more IoT devices 208, such as various sensors, manufacturing devices, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computation/communication system may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computation/communication system may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

The computation/communication system may also comprise and/or may be in communication with one or more user interface devices comprising one or more user input/output interfaces (e.g., a display 908 and/or speaker/speaker driver and a touch screen, keyboard, mouse, and/or microphone). For example, the output interface may be configured to provide an application, browser, user interface, dashboard, webpage, and/or similar words used herein interchangeably executing on and/or accessible via the computation/communication system to cause display or audible presentation of information/data and for user interaction therewith via one or more user input interfaces. The input device 912 can comprise any of a number of devices allowing computation/communication system to receive data, such as a keypad (hard or soft), a touch display, voice/speech or motion interfaces, scanners, readers, or other input device. In embodiments including a keypad 318, the keypad can include (or cause display of) the conventional numeric (0-9) and related keys (#, *), and other keys used for operating the computation/communication system and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computation/communication system can collect information/data, user interaction/input, and/or the like.

As will be appreciated, one or more of the computation/communication system's components may be located remotely from other computing system components, such as in a distributed system. Furthermore, one or more of the components may be aggregated and additional components performing functions described herein may be included in the analytic computing entity 20. Thus, the analytic computing entity 20 can be adapted to accommodate a variety of needs and circumstances.

That which is claimed:

1. A computer-implemented method for determining trust of an Internet of Things (IoT) system within a networked environment, the method comprising:

receiving, via a communication interface of a trust-as-a-service system in communication with the IoT system via a communication channel, system data indicative of artifacts of the IoT system harvested by a software agent installed on the IoT system, wherein the system data is pushed across the communication channel by the software agent installed on the IoT system, wherein the IoT system is in networked communication via the networked environment with one or more devices for operational interactions of the IoT system, and wherein the communication channel is initiated by the software agent installed on the IoT system and is characterized by a uniform resource locator (URL) associated with the trust-as-a-service system;

generating, via one or more processors, a baseline characteristics profile based at least in part on the system data;

storing the baseline characteristics profile within a storage device accessible to the one or more processors;

receiving, from the software agent installed on the IoT system and via the communication channel, updated system data indicative of updated artifacts harvested from the IoT system; and determining whether the updated system data indicates that the IoT system is compromised by:

comparing the updated system data against the baseline characteristics profile; and upon detecting a discrepancy between the updated system data and the baseline characteristics profile, establishing a trust metric based at least in part on the detected discrepancy.

2. The computer-implemented method of claim 1, wherein the system data comprises one or more of: system hardware data; system image data; application data; and system behavior data.

3. The computer-implemented method of claim 1, wherein at least a portion of the system data is harvested from firmware of the IoT system.

4. The computer-implemented method of claim 1, wherein the storage device implements a storage system embodied as a blockchain ledger.

5. The computer-implemented method of claim 1, further comprising steps for updating the baseline characteristics profile by: replacing at least a portion of the baseline characteristics profile with at least a portion of the updated system data.

6. The computer-implemented method of claim 1, further comprising steps for generating an alert upon determining that the trust metric indicates that the IoT system is compromised.

7. The computer-implemented method of claim 1, wherein: generating the baseline characteristics profile comprises generating a hash based at least in part on the system data; and comparing the updated system data against the baseline characteristics profile comprises: generating a hash based on the updated system data; and comparing the hash of the updated system data against the baseline characteristics profile.

8. A system for determining trust of an Internet of Things (IoT) system within a networked environment, the system comprising:

a communication interface in communication with the IoT system via a communication channel, wherein the communication interface is configured to receive system data indicative of artifacts of the IoT system harvested by a software agent installed on the IoT system, wherein the system data is pushed across the communication channel by the software agent installed on the IoT system, wherein the IoT system is in networked communication via the networked environment with one or more devices for operational interactions of the IoT system, and wherein the communication channel is initiated by the software agent installed on the IoT system and is characterized by a uniform resource locator (URL) associated with the trust-as-a- service system;

a storage device; and one or more processors collectively configured to:

generate a baseline characteristics profile based at least in part on the system data;

store the baseline characteristics profile within the storage device;

receive, via the communication interface in communication with the software agent installed on the IoT system and via the communication channel, updated system data indicative of updated artifacts harvested from the IoT system; and determine whether the updated system data indicates that the IoT system is compromised by:

comparing the updated system data against the baseline characteristics profile; and upon detecting a discrepancy between the updated system data and the baseline characteristics profile, establishing a trust metric based at least in part on the detected discrepancy.

9. The system of claim 8, wherein the system data comprises one or more of:

system hardware data; system image data; application data; and system behavior data.

10. The system of claim 8, wherein at least a portion of the system data is harvested from firmware of the IoT system.

11. The system of claim 8, wherein the storage device implements a storage system embodied as a blockchain ledger.

12. The system of claim 8, wherein the one or more processors are further configured for updating the baseline characteristics profile by: replacing at least a portion of the baseline characteristics profile with at least a portion of the updated system data.

13. The system of claim 8, wherein the one or more processors are further configured for generating an alert upon determining that the trust metric indicates that the IoT system is compromised.

14. The system of claim 8, wherein: generating the baseline characteristics profile comprises generating a hash based at least in part on the system data; and comparing the updated system data against the baseline characteristics profile comprises: generating a hash based on the updated system data; and comparing the hash of the updated system data against the baseline characteristics profile.

15. A non-transitory computer-readable storage medium comprising executable portions stored thereon, wherein the executable portions are configured to, when executed by a processor, cause the processor to:

receive, via a communication interface in communication with an IoT system via a communication channel, system data indicative of artifacts of the IoT system harvested by a software agent installed on the IoT system, wherein the system data is pushed across the communication channel by the software agent installed on the IoT system, wherein the IoT system is in networked communication via the networked environment with one or more devices for operational interactions of the IoT system, and wherein the communication channel is initiated by the software agent installed on the IoT system and is characterized by a uniform resource locator (URL) associated with the trust-as- a-service system;

generate a baseline characteristics profile based at least in part on the system data; store the baseline characteristics profile within a storage device accessible to the one or more processors;

receive, from the software agent installed on the IoT system via the communication channel, updated system data indicative of updated artifacts harvested from the IoT system; and determine whether the updated system data indicates that the IoT system is compromised by: comparing the updated system data against the baseline characteristics profile; and upon detecting a discrepancy between the updated system data and the baseline characteristics profile, establishing a trust metric based at least in part on the detected discrepancy.

16. The non-transitory computer readable storage medium of claim 15, wherein the system data comprises one or more of: system hardware data; system image data; application data; and system behavior data.

17. The non-transitory computer readable storage medium of claim 15, wherein the storage device implements a storage system embodied as a blockchain ledger.

18. The non-transitory computer readable storage medium of claim 15, wherein the executable portions are further configured to, when executed by the processor, cause the processor to: replace at least a portion of the baseline characteristics profile with at least a portion of the updated system data.

19. The non-transitory computer readable storage medium of claim 15, wherein the executable portions are further configured to, when executed by the processor, cause the processor to generate an alert upon determining that the trust metric indicates that the IoT system is compromised.

20. The non-transitory computer readable storage medium of claim 15, wherein: generating the baseline characteristics profile comprises generating a hash based at least in part on the system data; and comparing the updated system data against the baseline characteristics profile comprises: generating a hash based on the updated system data; and comparing the hash of the updated system data against the baseline characteristics profile.

* * * * *